United States Patent [19]

Ohba et al.

[11] Patent Number: 5,317,052
[45] Date of Patent: May 31, 1994

[54] POLYVINYL ALCOHOL PRODUCT AND MULTI-LAYER PRODUCT CONTAINING THE SAME

[75] Inventors: Hiroyuki Ohba, Niihari; Kazuhiko Hirose, Abiko; Hideaki Tanaka, Niihari; Nobuyuki Hisazumi, Tsuchiura, all of Japan

[73] Assignee: Kureha Kagaku Kogyo Kabushiki Kaisha, Tokyo, Japan

[21] Appl. No.: 792,856

[22] Filed: Nov. 19, 1991

[30] Foreign Application Priority Data

Nov. 30, 1990 [JP] Japan .................................. 2-338796
Oct. 11, 1991 [JP] Japan .................................. 3-263962
Oct. 11, 1991 [JP] Japan .................................. 3-263963

[51] Int. Cl.$^5$ ............................................... C08K 3/10
[52] U.S. Cl. ................................ 524/413; 524/401; 524/429; 524/434; 524/435; 524/436; 525/61
[58] Field of Search ............... 524/394, 401, 413, 423, 524/425, 429, 430, 436; 525/61

[56] References Cited

U.S. PATENT DOCUMENTS

| | | | |
|---|---|---|---|
| 3,674,768 | 7/1972 | Allum et al. | 525/61 |
| 3,882,196 | 5/1975 | Hanke | 525/56 X |
| 3,890,267 | 6/1975 | Fukushima et al. | 524/130 X |
| 4,148,781 | 4/1979 | Narukawa et al. | 524/423 X |
| 4,367,305 | 1/1983 | Satoh et al. | 524/398 |
| 4,529,539 | 7/1985 | Monma et al. | 524/419 X |
| 4,575,532 | 3/1986 | Schmukler et al. | 525/57 |
| 5,164,438 | 11/1992 | Umeyama et al. | 525/61 X |

FOREIGN PATENT DOCUMENTS 2-29447  1/1990  Japan.

*Primary Examiner*—Judy M. Reddick
*Attorney, Agent, or Firm*—Nixon & Vanderhye

[57] ABSTRACT

Disclosed herein are polyvinyl alcohol products obtained by heat-treating a melt-molded polyvinyl alcohol product composed of a polyvinyl alcohol composition containing 0.01 to 3.0 mmol of a metal compound based on 1 g of polyvinyl alcohol;

a polyvinyl alcohol product obtained by stretching a melt-molded polyvinyl alcohol product composed of a polyvinyl alcohol composition containing 0.01 to 3.0 mmol of a metal compound based on 1 g of polyvinyl alcohol; and a multi-layer product comprising at least one inner layer of a melt-molded product composed of a polyvinyl alcohol composition containing 0.01 to 3.0 mmol of a metal compound based on 1 g of polyvinyl alcohol.

12 Claims, 1 Drawing Sheet

Fig. 1

POLYVINYL ALCOHOL PRODUCT AND MULTI-LAYER PRODUCT CONTAINING THE SAME

BACKGROUND OF THE INVENTION

The present invention relates to a polyvinyl alcohol product and a multi-layer product containing the same.

Polyvinyl alcohol (hereinunder referred to as "PVA"), which is a resin excellent in a chemical resistance and physical properties, especially, in an oxygen gas barrier property in a dry phase, is used in a broad industrial field. PVA, however, has a crystal melting point (hereinunder referred to as "Tm") higher than the decomposition beginning temperature (hereinunder referred to as "Td"). It is, therefore, impossible to utilize a simple melt-extrusion process unlike polyethylene, polyvinyl chloride and polypropylene, and it is necessary to make pellets impregnated with a plasticizer such as glycerin and low-molecular polyethylene glycol or water, and to extrude the pellets by an extruder equipped with special melting, kneading and defoaming mechanisms (see *Poval*, p.377, published by KOBUNSHI KANKOKAI on Apr. 25, 1984 and *Encyclopedia of Polymer Science and Engineering* (1989) vol. 17, pp. 186 to 187, published by John Wiley and Sons, Inc.)

Therefore, when PVA is industrially used, it is generally formed into films, sheets and fibers by flow casting or wet spinning after PVA is dissolved in water.

In order to facilitate the hot working of PVA, use as a vinyl alcohol-vinyl acetate copolymer with a view to reducing the saponification degree of PVA or a copolymer of vinyl alcohol and ethylene, etc. has been proposed, but this way is defective in that the oxygen gas barrier property of the product obtained is lowered.

As a composition of PVA and a metal salt, the following methods and products are disclosed in the literatures.

(1) A method of producing a stock solution for a polyvinyl alcohol spinning or extruding product, comprising the steps of: preparing an aqueous solution of 20 to 80 wt % of at least one metal chloride selected from the group consisting of zinc chloride, calcium chloride, aluminum chloride and magnesium chloride or preparing a mixed aqueous solution by mixing not more than 40 wt % of hydrochloric acid, nitric acid or a water-soluble organic compound with the said aqueous solution; and dissolving polyvinyl alcohol or a copolymer mainly composed of vinyl alcohol in the said aqueous solution or mixed aqueous solution (Japanese Patent Publication No. 43-29660 (1968)).

(2) A gas barrier product produced by film-forming a water-soluble high-molecular material with lithium halide added thereto, or impregnating or coating a porous material with a water-soluble high-molecular material with lithium halide added thereto (Japanese Patent Application Laid-Open (KOKAI) No. 49-45882 (1974)).

(3) A method of producing a polyvinyl alcohol polarized film, comprising the steps of: film-forming an aqueous solution of polyvinyl alcohol with a water-soluble metal halide dissolved therein by flowcasting; and uniaxially stretching the film at 90° to 150° C. (Japanese Patent Application Laid-Open (KOKAI) No. 56-25419 (1981)).

(4) A heating element for generating heat by water, produced by mixing 3 to 100 parts by weight of a water-soluble resin with 100 parts by weight of magnesium chloride (Japanese Patent Application Laid-Open (KOKAI) No. 60-120784 (1985)).

(5) A moldable desiccating agent comprising a deliquescent salt and a high-water-absorbing synthetic resin as the main ingredients (Japanese Patent Application Laid-Open (KOKAI) No. 61-141916 (1986)).

(6) An adhesive PVA hydrogel composition comprising polyvinyl alcohol and a divalent metal salt as well as water as the main ingredients (Japanese Patent Application Laid-Open (KOKAI) No. 1-230659 (1989)).

However, conventional compositions of PVA and a metal salt, and products produced therefrom cannot be said to have a sufficiently high gas barrier property and, especially, in an atmosphere of a high humidity, the gas barrier property of such a film is so greatly lowered that the film cannot be put to practical use as a food packaging film.

As a result of studies undertaken by the present inventor so as to solve the above-described problems, it has been found that a PVA product obtained by heat-treating and/or stretching the molded product of PVA with a specific amount of metal compound added thereto and a multi-layer product having at least one inner layer of a melt-molded product of PVA with a specific amount of metal compound added thereto can maintain a high gas barrier property even at a high humidity. On the basis of these findings, the present invention has been achieved.

SUMMARY OF THE INVENTION

In a first aspect of the present invention there is provided a PVA produced by heat-treating a melt-molded PVA product comprising a PVA composition containing 0.01 to 3.0 mmol of a metal compound based on 1 g of PVA.

In a second aspect of the present invention there is provided a PVA product produced by stretching a melt-molded PVA product comprising a PVA composition containing 0.01 to 3.0 mmol of a metal compound based on 1 g of PVA.

In a third aspect of the present invention there is provided a multilayer product comprising at least one intermediate layer of a melt-molded product composed of a PVA composition containing 0.01 to 3.0 mmol of a metal compound based on 1 g of PVA.

In a fourth aspect of the present invention there is provided a melt-molded PVA product comprising a PVA composition containing 0.4 to 0.8 mmol of a calcium compound based on 1 g of PVA and/or 0.01 to 2.0 mmol of a lithium compound based on 1 g of PVA.

In a fifth aspect of the present invention there is provided a packaging material for fats and oils, organic chemicals, dry food and cosmetics, comprising a melt-molded PVA product composed of a PVA composition containing 0.01 to 3.0 mmol of a metal compound based on 1 g of PVA.

In a sixth aspect of the present invention there is provided a multilayer product having at least one layer of a PVA product produced by heat-treating a melt-molded PVA product composed of a PVA composition containing 0.01 to 3.0 mmol of a metal compound based on 1 g of PVA.

In a seventh aspect of the present invention there is provided a multi-layer product having at least one layer of a PVA product produced by stretching a melt-molded PVA product composed of a PVA composition containing 0.01 to 3.0 mmol of a metal compound based on 1 g of PVA.

DETAILED DESCRIPTION OF THE INVENTION

The PVA used in the present invention generally has a polymerization degree of 100 to 2000, preferably 200 to 1000 and a saponification degree of not less than 80%, preferably not less than 90%, more preferably not less than 95%. If the saponification degree is less than 80%, the barrier property is unfavorably lowered. If the polymerization degree is less than 100, the viscosity is lowered too much for an ordinary molding apparatus.

As the metal compound, any metal compound is usable so long as it is capable of raising the Td of the PVA higher than a flow beginning temperature (hereinunder referred to as "Tf") by not less than 15° C., preferably 20° to 70° C. Alkaline metal compounds such as lithium, sodium and potassium compounds; alkaline earth metal compounds such as calcium, magnesium and strontium compounds; and divalent to quadrivalent heavy metal compounds such as cobalt, tin, manganese, nickel, iron and titanium compounds are preferably used. As to the compound of any of these metals, halides such as chloride, bromide and iodide; inorganic acid salts such as carbonate, sulfate and nitrate; and organic acid salts such as acetate, lactate and stearate of these metals are usable.

These metal compounds may be used either singly or in the form of a mixture.

Concrete examples of a metal compound which is mixed with PVA are LiCl, NaCl, KCl, $MgCl_2$, $CaCl_2$, $SrCl_2$, $CoCl_2$, $SnCl_2$, LiBr, NaI, $Mg(NO_3)_2$, $NaNO_3$, $KNO_3$, $K_2CO_3$, $MgSO_4$, $CH_3COOLi$ and $CH_3COONa$.

The metal compounds have different actions depending upon the kind of a metal. Generally, lithium has a Tm lowering activity and a Td raising activity, and sodium and potassium have a Td raising activity while magnesium and calcium have a Tm lowering activity.

The amount of metal compound added is different depending upon the kind of a metal compound, but 0.01 to 3.0 mmol, preferably 0.1 to 2.0 mmol of the metal compound based on 1 g of PVA is used. If the amount of metal compound added is less than 0.01 mmol, the Td raising activity becomes to be lowered. On the other hand, if it is more than 3.0 mmol, Td becomes to be rather lowered, so that it is difficult to maintain the difference between Td and Tf at not less than 15° C., and thermal decomposition is apt to cause much coloring. When the amount of metal compound added is 0.01 to 2.0 mmol based on 1 g of PVA, since it is possible to enhance the gas barrier property of PVA, it is favorable to the use application utilizing the gas barrier property.

Particularly, the improvement of the gas barrier property is prominent in a melt-molded PVA product containing 0.5 to 2.0 mmol, preferably 0.7 to 1.5 mmol of an Li compound based on 1 g of PVA; of 0.1 to 1.5 mmol, preferably 0.2 to 1.0 mmol, more preferably 0.4 to 0.8 mmol of a calcium compound based on 1 g of PVA. These PVA products are preferably used in a field which requires a high gas barrier property.

Table 1 shows the effect of various metal compounds added to PVA on Tf, Tm and Td.

Tf is expressed by the temperature at which a sample is melted and begins to flow, measured by a flow tester (produced by Shimazu Seisakusho, Ltd.) under the conditions of a heating rate of 6° C./min, a load of 50 kg and a nozzle diameter of 1 mm. Tm is expressed by the temperature at which the differential thermal analysis (DTA) curve reached the maximum value when the temperature of about 5 mg of the sample is raised at a rate of 20° C./min in a nitrogen atmosphere, measured by a TAS 100 system (produced by Rigaku K.K.). Td is expressed by the temperature at which the weight in the thermogravimetry (TG) curve reduced by 1% from the weight at room temperature when the temperature of about 5 mg of a sample is raised at a rate of 20° C./min in a nitrogen atmosphere, measured by the same TAS system. Tg is measured in accordance with ASTM D8418 while the temperature of about 10 mg of a sample is raised at a rate of 20° C./min, measured by the calorimeter (Model DSC7, produced by Perkin Elmer Co.).

TABLE 1

| PVA* | Polymerization degree | Metal salt Type | Amount (PHR) | Amount (mmol/g) | Tf °C. | Tm °C. | Td °C. | Td-Tf °C. |
|---|---|---|---|---|---|---|---|---|
| PVA 105 | 500 | — | — | — | 205 | 220 | 190 | −15 |
| PVA 105 | 500 | LiCl | 0.4 | 0.1 | 205 | 220 | 223 | 18 |
|  |  |  | 1.2 | 0.3 | 202 | 217 | 242 | 40 |
|  |  |  | 2.1 | 0.5 | 199 | 213 | 268 | 69 |
|  |  |  | 4.2 | 1.0 | 181 | 197 | 244 | 63 |
|  |  |  | 8.4 | 2.0 | 157 | 170 | 200 | 43 |
| PVA 105 | 500 | NaCl | 2.9 | 0.5 | 205 | 220 | 268 | 63 |
|  |  |  | 5.8 | 1.0 | 205 | 220 | 244 | 39 |
|  |  |  | 11.6 | 2.0 | 207 | 217 | 252 | 45 |
|  |  |  | 29.0 | 5.0 | 207 | 220 | 190 | −17 |
| PVA 105 | 500 | KCl | 0.1 | 0.01 | 205 | 220 | 240 | 35 |
|  |  |  | 0.4 | 0.05 | 205 | 220 | 250 | 45 |
|  |  |  | 0.8 | 0.1 | 205 | 220 | 261 | 56 |
|  |  |  | 2.4 | 0.3 | 208 | 220 | 265 | 57 |
|  |  |  | 3.7 | 0.5 | 211 | 219 | 280 | 69 |
|  |  |  | 7.5 | 1.0 | 211 | 218 | 266 | 55 |
|  |  |  | 14.9 | 2.0 | 213 | 218 | 257 | 44 |
|  |  |  | 29.8 | 4.0 | 213 | 218 | 200 | −13 |
|  |  |  | 37.0 | 5.0 | 213 | 218 | 180 | −33 |
| PVA 105 | 500 | $MgCl_2$ | 1.0 | 0.1 | 200 | 213 | 248 | 48 |
|  |  |  | 2.9 | 0.3 | 197 | 212 | 252 | 55 |
|  |  |  | 4.8 | 0.5 | 186 | 200 | 247 | 61 |

TABLE 1-continued

| PVA* | Polymerization degree | Metal salt Type | Amount (PHR) | Amount (mmol/g) | Tf °C. | Tm °C. | Td °C. | Td-Tf °C. |
|---|---|---|---|---|---|---|---|---|
| | | | 9.5 | 1.0 | 173 | 185 | 245 | 72 |
| | | | 19.0 | 2.0 | 153 | 170 | 210 | 57 |
| PVA 105 | 500 | Mg(NO3)2 | 7.4 | 0.5 | 203 | 208 | 243 | 40 |
| | | | 14.8 | 1.0 | 185 | — | 200 | 15 |
| PVA 105 | 500 | CaCl2 | 1.1 | 0.1 | 205 | 220 | 240 | 35 |
| | | | 3.3 | 0.3 | 200 | 215 | 230 | 30 |
| | | | 5.6 | 0.5 | 192 | 209 | 222 | 30 |
| | | | 11.1 | 1.0 | 185 | — | 235 | 50 |
| | | | 22.2 | 2.0 | 160 | — | 175 | 15 |
| PVA 105 | 500 | SrCl2 | 7.9 | 0.5 | 197 | 214 | 247 | 50 |
| PVA 105 | 500 | CoCl2 | 2.4 | 0.2 | 196 | 206 | 256 | 60 |
| PVA 105 | 500 | SnCl2 | 3.8 | 0.2 | 200 | 209 | 255 | 55 |
| PVA 108 | 800 | MgCl2 | 2.9 | 0.3 | 205 | 212 | 252 | 47 |
| PVA 110 | 1000 | MgCl2 | 2.9 | 0.3 | 206 | 212 | 253 | 47 |
| PVA 105 | 500 | NaNO3 | 3.0 | 0.6 | 211 | 217 | 252 | 51 |
| | | | 2.0 | 0.4 | 211 | 217 | 248 | 47 |

(Note)*:
The saponification degrees of PVA's 105, 108 and 110 were all 98.5%.

As shown in Table 1, in the case of a PVA which did not contain any metal compound, (Td-Tf)= −15° C., and thermal decomposition was caused at the time of melt-extrusion, thereby making the melt-extrusion difficult. When 0.1 to 3.0 mmol of a metal compound based on 1 g of PVA was contained, Td became higher than Tf, thereby enabling melt-extrusion. The preferred difference (Td-Tf) for melt-extrusion is not less than 15° C., more preferably 20° to 70° C.

One of the merits of the present invention is that when the amount of metal compound added is 0.1 to 2.0 mmol based on 1 g of PVA, the gas barrier property of the PVA is more improved, as described below.

The PVA-metal compound composition is formed into any product such as film, sheet, tube and container by melt-molding such as hot press molding, injection molding and extrusion (T-die molding, blow molding, inflation extrusion, etc.). The case of forming a film by extrusion will be explained as an example in the following.

PVA and a metal compound may be uniformly mixed by a mixer such as a tumbler and a Henschel mixer. Alternatively, an aqueous solution of a metal compound may be added to PVA, then pelletized by Banbury type mixer, single extruder, twin extruder, etc. and dried. It is also possible to dissolve PVA into an aqueous solution of a metal compound and dry the solution.

The thus-obtained PVA-metal compound composition is supplied to an extruder and melted and kneaded. The molten material is formed into a film or a sheet by a T-die or the like which is connected to an extruder at a die temperature of 170° to 270° C.

As the PVA product according to the present invention, the following products may be exemplified.

(1) A heat-treated, melt-molded PVA product.
(2) A heat-treated multi-layer product having at least one melt-molded PVA product.
(3) A stretched, melt-molded PVA product.
(4) A stretched multi-layer product having at least one melt-molded PVA product.
(5) A multi-layer product having at least one intermediate layer of melt-molded PVA product.
(6) A melt-molded PVA product containing a specific amount of specific metal compound.
(7) A melt-molded PVA product used for packaging fats and oils, organic chemicals, dry food and cosmetics.
(8) A melt-molded product composed of PVA-metal compound composition and polyamide.

(1) A heat-treated, melt-molded PVA product:

A melt-molded PVA product obtained by mixing a metal compound with PVA in the mixing ratio of 0.01 to 3.0 mmol based on 1 g of PVA, melting and kneading the mixture, and molding the resultant mixture, is heat-treated at a temperature in the range of not lower than the glass transition temperature (Tg), preferably not lower than 100° C. and not higher than Tf. The heat-treating time has a close relation to the kind and the amount of metal compound in PVA. In the case of LiCl, for example, the larger amount of LiCl is added to PVA, the longer heat-treating time is required for improving the oxygen permeability. Generally, the gas barrier property of the obtained product is improved with the increase in the heat-treating time, but since too long heat-treating time is industrially disadvantageous, it is preferable to select the most appropriate heat-treating time in accordance with the material of a melt-molded product and a melt-molding process. The heat-treating time is generally 2 seconds to 90 minutes, preferably 5 seconds to 1 minute.

The melt-molded PVA product may be subjected to heat-treatment at any given stage. For example, the melt-molded product may be heat-treated while keeping the above-described predetermined temperature during the process of cooling the melt-molded product to room temperature. Alternatively, after the melt-molded product is cooled, it may be raised to the above-described predetermined temperature for heat-treatment.

The melt-molded product may be heat-treated either at one stage or multiple stages. Infrared rays, electric heat, hot water, hot air and high-frequency wave may be cited as a heating means. It is considered to be because the crystallization of the molecular chains of PVA progresses that the gas barrier property is improved by heat-treatment.

The thus-obtained single-layer heat-treated, melt-molded product of PVA with a metal compound added thereto is used as a sheet, a film or a container such as a cup and a bottle. The thickness of the heat-treated product is 1 to 100 μm, preferably 3 to 50 μm.

(2) A heat-treated multi-layer product having at least one melt-molded PVA product:

A heat-treated multi-layer product may be produced by laminating a sheet or a film of other resin to the sheet or the film as the above-described heat-treated melt-molded PVA product. It is also possible to obtain a heat-treated multi-layer product by co-extruding the PVA-metal compound composition and other resin from a die for multiple layers by using a plurality of extruders so as to produce a multi-layer film or a multi-layer container, and heat-treating the thus-obtained product. The layer structure of the heat-treated multi-layer product is not specified, but at least one layer is a layer of the heat-treated, melt-molded product composed of PVA-metal compound composition according to the present invention. The thickness of the layer of the heat-treated, melt-molded PVA product is 1 to 100 μm, preferably 3 to 50 μm, and the thickness of the heat-treated multi-layer product of the present invention is 10~500 μm, preferably 30~300 μm.

(3) A stretched melt-molded PVA product:

A stretched melt-molded PVA product is obtained by mixing a metal compound with PVA in the mixing ratio of 0.01 to 3.0 mmol based on 1 g of PVA, melting and kneading the mixture, molding the resultant mixture and stretching the thus-obtained melt-molded PVA product by tentering or inflation. Although the stretching ratio is preferably as high as possible, for the purpose of giving a high barrier product, it is usually at least twice, more preferably 4 to 12 times in area magnification. If the stretching ratio is less than 2 in area magnification, the barrier property at a high humidity is not improved so much. The melt-molded product is generally stretched at 80° to 150° C. for not more than 5 minutes, preferably 2 seconds to 1 minute. It is considered to be because the orientation and crystallization of the molecular chains of PVA progress that the gas barrier property is improved by the stretching.

The thus-obtained single-layer stretched, melt-molded PVA product is used as a sheet, a film or a container such as a cup and a bottle. The thickness of the stretched, melt-molded product is 1 to 100 μm, preferably 3 to 50 μm.

(4) A stretched multi-layer product having at least one melt-molded PVA product:

A stretched multi-layer product may be produced by laminating a sheet or a film of other resin to the sheet or the film as the above-described stretched melt-molded PVA product. It is also possible to obtain a stretched multi-layer product by co-extruding the PVA-metal compound composition and other resins from a die for multiple layers by using a plurality of extruders so as to produce a multi-layer film or a multi-layer container, and stretching the thus obtained product. The layer structure of the stretched multi-layer product is not specified, but at least one layer is a layer of the stretched melt-molded product composed of PVA-metal compound composition according to the present invention. The thickness of the layer of the stretched melt-molded PVA product in the stretched multi-layer product of the present invention is 1 to 100 μm, preferably 3 to 50 μm, and the thickness of the stretched multi-layer product of the present invention is 10~500 μm, preferably 30~300 μm.

The single-layer stretched melt-molded product or multi-layer stretched product of the present invention is heat-set, if necessary, after stretching. Heat-setting is preferably carried out at 80° to 200° C. for not more than 1 minute.

In the thus-obtained multi-layer heat-treated or stretched product, the oxygen permeability is small and the ratio of the carbon dioxide gas permeability to the oxygen permeability (carbon dioxide gas permeability/oxygen permeability) is large, so that the multi-layer product according to the present invention is useful as a packaging material for cheese products, coffee beans, etc.

(5) A multi-layer product having at least one intermediate layer of melt-molded PVA product:

A multi-layer product having a melt-molded PVA product as at least one intermediate layer may be produced by laminating sheets or films of other resins to a melt-molded PVA product, or by co-extruding the PVA-metal compound composition and other resins from a die for multiple layers by using a plurality of extruders.

For other layers constituting multiple layers, a thermoplastic resin which is capable of being co-extruded is preferable. For example, olefin resins such as polyethylene, polypropylene, ethylene-propylene copolymer, ethylene-vinyl acetate copolymer, ethylene-acrylic acid copolymer, ethylene-methyl metacrylate copolymer, ethylene-acrylate copolymer, ethylene-ethyl acrylate copolymer and ionomer; polyesters such as polyethylene terephthalate and polybutylene terephthalate; polyamides; and polycarbonates are usable.

Among co-extruded multi-layer products, multi-layer products having a layer composed of PVA-metal compound composition as the core layer and thermoplastic resin layers as both outer layers are especially preferred. As the thermoplastic resin, in the case where an olefin resin is used, it is possible to preserve the melt-molded PVA product layer from the influence of external water and maintain a good gas barrier property not only at a high humidity but also in a wet state.

In the case of a multi-layer co-extruded product, it is possible to provide an adhesive layer between every adjacent layers by using a meltable adhesive resin. As the adhesive resin, thermoplastic polymers containing carboxyl groups or a derivative thereof, for example, polyolefins which are graft-modified by maleic acid, fumaric acid, anhydrous maleic acid or the like; resins obtained by copolymerizing these monomers with olefins; and adipic acid polyesters having an urethane-combined carboxylic group are usable.

In the case of forming a multi-layer co-extruded product, respective components are melted and kneaded by a plurality of extruders, and the thus-melted and kneaded materials are introduced to an annular die or T-die for lamination, laminated, for example, in the order of inner layer/adhesive layer/core layer (melt-molded PVA product)/adhesive layer/outer layer and co-extruded. The co-extruded film is quenched by cold water of 5° to 30° C. or by a chill roll, thereby obtaining a multi-layer film.

The thickness of the melt-molded PVA product in the multi-layer product of the present invention is 1 to 100 μm, preferably 3 to 50 μm, and the thickness of the multi-layer product of the present invention is 10~500 μm, preferably 30~300 μm.

Examples of the structure of the multi-layer product of the present invention are as follows:

(1) PE/Ad/melt-molded PVA product/Ad/PE
(2) EVA/Ad/melt-molded PVA product/Ad/IO
(3) EVA/Ad/melt-molded PVA product/Ad/EVA
(4) EVA/Ad/melt-molded PVA product/Ad/PP
(5) EVA/Ad/melt-molded PVA product/Ad/PC (6) PP/Ad/melt-molded PVA product/Ad/PP
(7) EVA/Ad/melt-molded PVA product/Ad/PA
(8) EVA/Ad/melt-molded PVA product/Ad/PET Note PE: Polyethylene
IO: Ionomer
EVA: Ethylene-vinyl acetate copolymer
PC: Polycarbonate
PA: polyamide
PET: Polyester
Ad: Adhesive layer (6) A melt-molded PVA product containing a specific amount of specific metal compound:

A melt-molded PVA product is obtained by mixing a calcium compound and/or a lithium compound with PVA in a respective mixing ratio of 0.4 to 0.8 mmol and 0.01 to 2.0 mmol based on 1 g of PVA, melting and kneading the mixture, and molding the resultant mixture.

(7) A packaging material for fats and oils, organic chemicals, dry food and cosmetics:

A melt-molded PVA product containing 0.01 to 3.0 mmol of a metal compound based on 1 g of PVA is insoluble in an organic chemical and has a very small permeability. This melt-molded PVA product is, therefore, used as a packaging material for fats and oils such as animal oils, vegetable oils, alcohols, ethers, ketones and esters and organic chemicals which must be prevented from oozing out. In addition, since this melt-molded PVA product has a good smell keeping property, it is used as a packaging material for dry foods such as cookies, crackers and rice cakes, and cosmetics the commercial values of which reduce if the smells thereof diffuse.

(8) A melt-molded product composed of PVA-metal compound composition and polyamide:

A melt-molded product obtained by blending 1 to 99 wt %, preferably 30 to 90 wt % of a PVA-metal compound composition containing 0.01 to 3.0 mmol of a metal compound based on 1 g of PVA and 99 to 1 wt %, preferably 70 to 10 wt % of polyamide is excellent in the impact strength, in particular, the impact strength at a low temperature.

As a polyamide, nylon 4-6, nylon 6, nylon 6-66, nylon 6-10, nylon 6-12, nylon 8, nylon 9, nylon 11 and nylon 12 may be exemplified.

It is possible to add thermoplastic resins such as polyethylene, polyethylene grafted by maleic acid, polypropylene, polyester, ethylene-acrylic acid copolymer, ethylene-vinyl acrylate copolymer, ethylene-ethyl acrylate copolymer and ionomers; elastomers; plasticizer, stabilizer; lubricant; antioxidant; inorganic and organic additives such as inorganic filler and pigment to a PVA-metal compound composition in the range which does not hinder an object and effect of the present invention.

A single-layer or multi-layer sheet or film of the present invention can be formed into a pouch container by securing the opposing edges to each other. They may be secured to each other by an epoxy or isocyanate adhesive, or by heat-sealing or high-frequency heat-sealing.

By melt-molding PVA with a specific amount of metal compound added thereto, it is possible to obtain a melt-molded PVA product which is conventionally considered to be difficult to obtain without impairing the gas barrier property. In addition, PVA product is easy to manufacture industrially in comparison with a product by a flow casting method. Especially, if the metal compound is in a specified range, it is possible to improve the gas barrier property of PVA.

The multi-layer co-extruded product obtained by co-extrusion is easy to manufacture, and if it has a melt-molded PVA product composed of a PVA-metal compound composition for the core layer and a thermoplastic resin for inner and outer layers, it exhibits an excellent gas barrier property at a high humidity and even in a wet state. Since the sheet and film of the present invention has an excellent oxygen gas barrier property, they are particularly suitable as a packaging material for meat, ham and sausage which are easily degenerated by oxygen gas.

Also, a heat-treated melt-molded PVA product and stretched melt-molded PVA product which have superior gas barrier property, are suitable as a packaging material for meat, ham and sausage which are easily degenerated by oxygen gas, and a packaging material for carbonated beverages, etc. the commercial values of which reduce when carbon dioxide gas permeates them.

Among the multi-layer co-extruded products, a multi-layer stretched product which has a melt-molded PVA product composed of a PVA-metal compound composition for the core layer and a thermoplastic resin for inner and outer layers is preferable. As the thermoplastic resin, an olefin resin is especially preferable, because it is possible to preserve the melt-molded PVA layer from the influence of external water and maintain a good gas barrier property even at a high humidity in combination with the gas barrier property improving effect brought about by the stretching.

If the melt-molded product is stretched under heating, an especially excellent gas barrier property is exhibited, even at a high humidity, owing to both the heat-treatment and the stretching.

EXAMPLES

The present invention will be explained hereinunder with reference to the following examples. It is to be understood that these examples are only illustrative and the present invention is not restricted thereto.

Examples 1 to 20, Comparative Examples 1 to 4

An aqueous solution of a metal compound was mixed with PVA [Poval® PVA 105, produced by Kuraray Co., Ltd., polymerization degree: 500, saponification degree: 98.5%] in the weight ratio of 1:1 so that the metal compound content came to the amount shown in Table 2. After the PVA was immersed in the aqueous solution at room temperature overnight, it was dried at 110° C. for 3 hours, thereby obtaining PVA containing the metal compound. The PVA containing the metal compound was melt-molded by a 30-Φ single screw extruder (L/D=22) with a T-die set thereon, thereby obtaining a film of 20 μm in thickness. The die temperature was shown in Table 2. The cylinder temperature of the extruder was set at 80° to 230° C. in accordance with an ordinary method. The extrusion rate was 40 g/min.

In Examples 1 to 20, the melt-extrudability was very good free from undesirable phenomena such as foaming and coloring. In contrast, when no metal compound was added to PVA (Comparative Example 4), vehement foaming was generated due to thermal decomposition, which made hot molding completely impossible. When 5 mmol of a metal compound based on 1 g of PVA were added to PVA (Comparative Examples 1 to 3), coloring was too strong and the melt extrudability was insufficient.

The oxygen permeability coefficient and the carbon dioxide gas permeability coefficient of each film obtained were measured at a temperature of 30° C. and 0% RH by using a gas permeability tester (YANACO GTR-10A, produced by Yanagimoto Seisakusho Co.). The results are shown in Table 2.

TABLE 2

|  | Metal compound Type | Metal compound Amount mmol/g | Die Temperature °C. | Melt-formability | Oxygen permeability coefficient cc · cm/cm² · sec · cmHg | Carbon dioxide gas permeability coefficient cc · cm/cm² · sec · cmHg |
|---|---|---|---|---|---|---|
| Example 1 | LiCl | 0.1 | 225 | ○ | $8.0 \times 10^{-15}$ | $3.2 \times 10^{-14}$ |
| Example 2 | " | 0.5 | 230 | ○ | $4.5 \times 10^{-15}$ | $1.8 \times 10^{-14}$ |
| Example 3 | " | 1.0 | 200 | ○ | $3.0 \times 10^{-15}$ | $1.2 \times 10^{-14}$ |
| Example 4 | " | 2.0 | 185 | ○ | $5.0 \times 10^{-15}$ | $2.0 \times 10^{-14}$ |
| Example 5 | NaCl | 0.5 | 240 | ○ | $5.9 \times 10^{-15}$ | $2.4 \times 10^{-14}$ |
| Example 6 | " | 1.0 | 235 | ○ | $6.0 \times 10^{-15}$ | $2.4 \times 10^{-14}$ |
| Example 7 | " | 2.0 | 230 | ○ | $8.0 \times 10^{-15}$ | $3.2 \times 10^{-14}$ |
| Example 8 | KCl | 0.05 | 230 | ○ | $8.5 \times 10^{-15}$ | $3.4 \times 10^{-14}$ |
| Example 9 | " | 0.1 | 230 | ○ | $8.0 \times 10^{-15}$ | $3.2 \times 10^{-14}$ |
| Example 10 | " | 1.0 | 230 | ○ | $5.5 \times 10^{-15}$ | $2.2 \times 10^{-14}$ |
| Example 11 | " | 2.0 | 230 | ○ | $7.5 \times 10^{-15}$ | $3.0 \times 10^{-14}$ |
| Example 12 | MgCl₂ | 0.1 | 230 | ○ | $7.8 \times 10^{-15}$ | $3.1 \times 10^{-14}$ |
| Example 13 | " | 0.5 | 220 | ○ | $5.0 \times 10^{-15}$ | $2.0 \times 10^{-14}$ |
| Example 14 | " | 1.0 | 220 | ○ | $4.5 \times 10^{-15}$ | $1.4 \times 10^{-14}$ |
| Example 15 | " | 2.0 | 190 | ○ | $9.0 \times 10^{-15}$ | $3.6 \times 10^{-14}$ |
| Example 16 | CaCl₂ | 0.1 | 230 | ○ | $2.5 \times 10^{-15}$ | $1.0 \times 10^{-14}$ |
| Example 17 | " | 0.5 | 225 | ○ | $1.5 \times 10^{-15}$ | $6.0 \times 10^{-15}$ |
| Example 18 | " | 1.0 | 220 | ○ | $2.8 \times 10^{-15}$ | $1.1 \times 10^{-14}$ |
| Example 19 | CoCl₂ | 0.2 | 230 | ○ | $9.0 \times 10^{-15}$ | $3.6 \times 10^{-14}$ |
| Example 20 | SnCl₂ | 0.2 | 230 | ○ | $9.0 \times 10^{-15}$ | $3.6 \times 10^{-14}$ |
| Comp. Example 1 | NaCl | 5.0 | 230 | X (Coloring) | $1.5 \times 10^{-14}$ | $6.0 \times 10^{-14}$ |
| Comp. Example 2 | MgCl₂ | 5.0 | 230 | X (Coloring) | $1.0 \times 10^{-13}$ | $4.0 \times 10^{-13}$ |
| Comp. Example 3 | CaCl₂ | 5.0 | 230 | X (Coloring) | $5.0 \times 10^{-13}$ | $2.0 \times 10^{-12}$ |
| Comp. Example 4 | None | | 230 | X (Foaming) | — | — |

Figure 1:
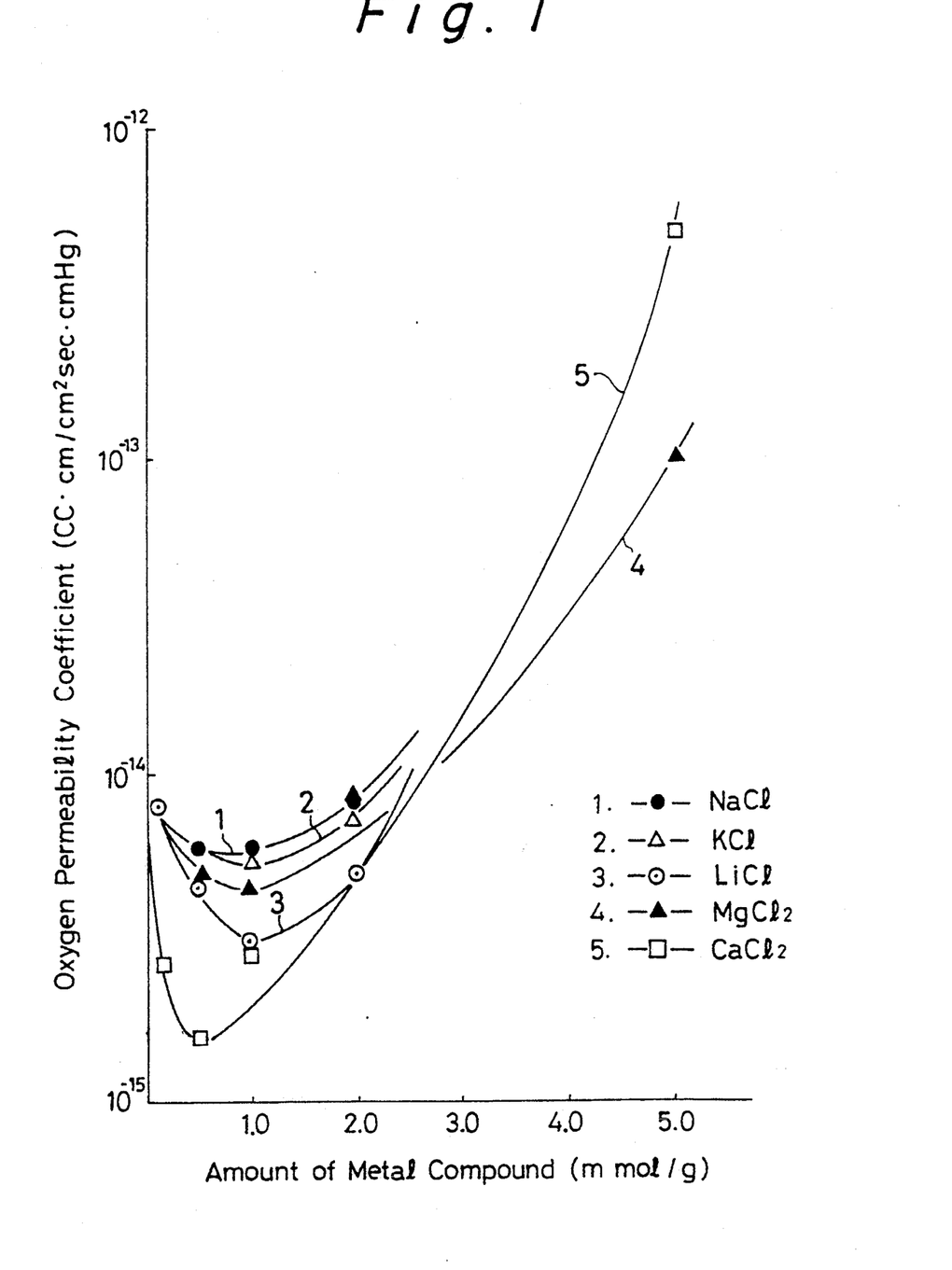
FIG. 1 shows the relationship between the oxygen permeability coefficient of a film composed of a PVA-metal compound composition and the amount of metal compound added.

The relationship between the oxygen permeability coefficient and the amount (mmol based on 1 g of PVA) of metal compound added thereto is shown in FIG. 1. It is obvious from FIG. 1 that when the amount of metal compound added is not more than 2.0 mmol based on 1 g of PVA, the oxygen permeability coefficient of the film produced from PVA with a metal compound added thereto is smaller than that of a film (cast film) produced from PVA with no metal compound added thereto, and that the gas barrier property is enhanced by adding a metal compound. The cast film, here, was obtained by casting an aqueous 10% solution of Poval ® PVA 105 on a glass plate and drying the PVA solution. The oxygen permeability coefficient of the thus-obtained casting film was $9.5 \times 10^{-15}$ cc·cm/cm²·sec·cmHg and the carbon dioxide gas permeability coefficient thereof was $3.8 \times 10^{-14}$ cc·cm/cm²·sec·cmHg.

EXAMPLES 21 TO 31, COMPARATIVE EXAMPLES 5 TO 7

A PVA-metal compound composition shown in Table 3 was obtained in the same way as in Examples 1 to 20. The PVA used was the same as in Examples 1 to 20.

The polyethylene for the first layer (inner layer) was extruded by 35-Φ single extruder (L/D=22) and the polyethylene for the third layer (outer layer) was extruded by 40-Φ single extruder (L/D=22) separately from each other. The PVA-metal compound composition for the second layer (core layer) was co-extruded with these polyethylenes from a 25-Φ single screw extruder equipped with a T-die of 35 mm wide so that the PVA-metal compound composition constituted the core layer in the melt extrusion feed block. The extrusion rate was 200 g/min. The extruded product was chilled by a chill roll directly under the die, thereby obtaining three-layer laminated film. As the polyethylene for the first and third layers, low-density polyethylene (Sumikathere ® F 114-1, produced by Sumitomo Chemical Co., Ltd.) was used. The die temperature and the adapter temperature are shown in Table 3 as the extrusion temperature.

The total thickness of the laminated film was 120 μm, the thickness of each polyethylene layer was 50 μm, and the thickness of the PVA layer was 20 μm.

In Examples 21 to 31, the melt extrudability was very good free from undesirable phenomena such as foaming and coloring.

In contrast, in Comparative Example 5, vehement foaming was generated due to thermal decomposition, which made co-extrusion completely impossible.

In Comparative Examples 6 to 7, the amount of metal compound added was too large for melt-forming, and the films were colored.

To oxygen permeability and the carbon dioxide gas permeability of each film obtained were measured at a temperature of 30° C. and 0% RH by using a gas permeability tester (YANACO GTR-10A, produced by Yanagimoto Seisakusho Co.). The results are shown in Table 3.

TABLE 3

|  | Metal compound Type | Metal compound Amount mmol/g | Extrusion temperature °C. | Melt-formability | Permeability (cc/m² · day · atm) O₂ | Permeability (cc/m² · day · atm) CO₂ |
|---|---|---|---|---|---|---|
| Example 21 | LiCl | 0.3 | 225 | ○ | 0.20 | 0.80 |

TABLE 3-continued

|  | Metal compound | | Extrusion temperature °C. | Melt-formability | Permeability (cc/m² · day · atm) | |
|---|---|---|---|---|---|---|
|  | Type | Amount mmol/g | | | $O_2$ | $CO_2$ |
| Example 22 | " | 0.5 | 230 | ◯ | 0.15 | 0.60 |
| Example 23 | NaCl | 0.5 | 240 | ◯ | 0.19 | 0.76 |
| Example 24 | " | 1.0 | 235 | ◯ | 0.20 | 0.80 |
| Example 25 | KCl | 0.1 | 230 | ◯ | 0.26 | 1.04 |
| Example 26 | " | 1.0 | 230 | ◯ | 0.18 | 0.72 |
| Example 27 | " | 2.0 | 230 | ◯ | 0.25 | 1.00 |
| Example 28 | $MgCl_2$ | 0.1 | 230 | ◯ | 0.26 | 1.04 |
| Example 29 | " | 0.3 | 220 | ◯ | 0.20 | 0.80 |
| Example 30 | $CaCl_2$ | 0.1 | 230 | ◯ | 0.08 | 0.32 |
| Example 31 | " | 0.3 | 225 | ◯ | 0.06 | 0.24 |
| Comp. Example 5 | None | | 230 | X (Foaming) | — | — |
| Comp. Example 6 | $MgCl_2$ | 5.0 | 230 | X (Coloring) | — | — |
| Comp. Example 7 | $CaCl_2$ | 5.0 | 230 | X (Coloring) | — | — |

EXAMPLES 32 AND 33

An aqueous solution of a metal compound was mixed with PVA [Poval ® PVA 105, produced by Kuraray Co., Ltd., polymerization degree: 500, saponification degree: 98.5%] in the weight ratio of 1:1 so that the metal compound content came to the amount shown in Table 4. After the PVA was immersed in the aqueous solution at room temperature overnight, it was dried at 120° C. for 3 hours, thereby obtaining PVA containing the metal compound. The PVA containing the metal compound was melt-molded by a 30-Φ single screw extruder (L/D=22) with a T-die set thereon, thereby obtaining a film of 30 μm in thickness. The die temperature was 200° C. in the case of a PVA composition with 1.0 mmol of lithium chloride added thereto based on 1 g of PVA and 230° C. in the case of a PVA composition with 0.5 mmol of potassium chloride added thereto based on 1 g of PVA. Tf was 181° C. in the case of a PVA composition with lithium chloride added thereto, and Tf was 211° C. in the case of a PVA composition with potassium chloride added thereto. Tg was 80° C. in the case of a PVA composition with lithium chloride added thereto, and Tg was 64° C. in the case of a PVA composition with potassium chloride added thereto. Tf is expressed by the temperature at which a sample was melted and began to flow, measured by a flow tester (produced by Shimazu Seisakusho, Ltd.) under the conditions that the heating rate was 6° C./min, the load was 50 kg and the nozzle diameter was 1 mm. Tg was measured in accordance with ASTM D8418 while the temperature of about 10 mg of a sample was raised at a rate of 20° C./min, measured by the calorimeter (Model DSC7, produced by Perkin Elmer Co.).

EXAMPLES 34 TO 40

The obtained films in Examples 32 and 33 were charged into a gear-oven while being fixed in a frame in a tightened state, and heat-treated under the heat-treating conditions (temperature and time) shown in Table 4, thereby obtaining a heat-treated film. No change was observed in the film thickness between before and after the heat-treatment.

The oxygen permeability of each of the thus-obtained PVA films is shown in Table 4. It is obvious that the oxygen permeability of a heat-treated film is much smaller than that of the untreated film.

The oxygen permeability of each film obtained in Examples 32 to 40 was measured in accordance with ASTM D3985-81 at 30° C. and 80% RH by using a MOCON ® OXTRAN ®-Model 100 (produced by MODERN CONTROL CO.).

TABLE 4

Oxygen permeability of a film of PVA containing metal compound

| | Metal compound | | Heat-treating conditions | | Oxygen permeability cc/m² · day · atm (calculated as a film of 30 μm thick) |
|---|---|---|---|---|---|
| | type | mmol/g | Temperature | Min. | |
| Example 32 | LiCl | 1.0 | — | — | 200 |
| Example 33 | KCl | 0.5 | — | — | 250 |
| Example 34 | LiCl | 1.0 | 120 | 30 | 145 |
| Example 35 | LiCl | 1.0 | 160 | 30 | 137 |
| Example 36 | KCl | 0.5 | 120 | 30 | 140 |
| Example 37 | KCl | 0.5 | 160 | 5 | 82 |
| Example 38 | KCl | 0.5 | 160 | 10 | 75 |
| Example 39 | KCl | 0.5 | 160 | 30 | 65 |
| Example 40 | KCl | 0.5 | 160 | 60 | 35 |

EXAMPLE 41

A PVA composition containing 1.0 mmol of lithium chloride based on 1 g PVA was obtained in the same way as in Example 32.

An ethylene-vinyl acetate copolymer (NUC3190, produced by Nippon Unicar Co., Ltd.) for the first layer (inner layer), an ionomer resin (Hi-milan ®, produced by Mitsui Dupon, Ltd.) for the fifth layer (outer layer), adhesive resins (Admer ® SF 750, produced by Mitsui Petrochemical Industries, Ltd.) for the second and fourth layers, and the above-described PVA composition containing lithium chloride for the third layer (core layer) were co-extruded from a T-die of 350 mm wide through respective extruders at a die temperature of 220° C. so that the PVA-metal compound composition constituted the core layer. The extrusion rate was 200 g/min. The extruded product was chilled by a chill roll directly under the die, thereby obtaining a five-layer laminated film. The thickness of the first layer was 12 μm, each thickness of the second and fourth layer was 2 μm, the thickness of the third layer was 15 μm, and the thickness of the fifth layer was 28 μm. The total thickness of the laminated film was 59 μm. The melt extrudability was good free from undesirable phenomena such as foaming and coloring.

EXAMPLE 42

The obtained laminated film in Example 41 was charged into a gear-oven while being fixed in a tightened state so as to be heat-treated at 160° C. for 30 minutes. The oxygen permeabilities of the untreated laminated film (Example 41) and the heat-treated laminated film (Example 42) measured at 30° C. and 80% RH in the same way as in Example 32 were 400 cc/m$^2$·day·atm and 290 cc/m$^2$·day·atm, respectively. It is obvious that the oxygen permeability of the heat-treated laminated film was greatly improved in comparison with the untreated laminated film.

EXAMPLES 43 TO 49

An aqueous solution of a metal compound was mixed with PVA [Poval® PVA 105, produced by Kuraray Co., Ltd., polymerization degree: 500, saponification degree: 98.5%] in the weight ratio of 1:1 so that the metal compound content came to the amount shown in Table 5. After the PVA was immersed in the aqueous solution at room temperature overnight, it was dried at 120° C. for 3 hours, thereby obtaining PVA containing the metal compound. The PVA containing the metal compound was press-molded at 220° to 230° C. by a bench press (AYSR model 5, produced by Shinto Metal Industries Co., Ltd.), and thereafter stretched at 80° to 150° C. by a biaxial stretching machine (produced by Toyo Seiki K. K.). The stretchability of each film was evaluated, and the results are shown in Table 5. In Table 5, the mark ◯ shows that the film is stretchable to not less than four times by area magnification.

TABLE 5

Stretchability of PVA containing metal compound

| | Metal compound | | |
|---|---|---|---|
| | type | mmol/g | Stretchability |
| Example 43 | LiCl | 0.5 | ◯ |
| Example 44 | LiCl | 1.0 | ◯ |
| Example 45 | NaI | 0.5 | ◯ |
| Example 46 | MgCl$_2$ | 0.3 | ◯ |
| Example 47 | MgCl$_2$ | 0.5 | ◯ |
| Example 48 | CaCl$_2$ | 0.5 | ◯ |
| Example 49 | CoCl$_2$ | 0.5 | ◯ |

EXAMPLES 50 TO 53

An aqueous solution of a metal compound was mixed with PVA [Poval® PVA 105, produced by Kuraray Co., Ltd., polymerization degree: 500, saponification degree: 98.5%] in the weight ratio of 1:1 so that the metal compound content came to the amount shown in Table 6. After the PVA was immersed in the aqueous solution at room temperature overnight, it was dried at 120° C. for 3 hours, thereby obtaining PVA containing the metal compound. The PVA containing the metal compound was melt-molded by a 30-Φ single screw extruder (L/D=22) with a T-die set thereon, thereby obtaining a film of 30 μm in thickness. The die temperature was 220° to 240° C.

EXAMPLES 54 TO 59

The obtained films in Examples 50 to 53 were stretched by a biaxial stretching machine (produced by Toyo Seiki K. K.) by area magnification shown in Table 6. The oxygen permeabilities of the unstretched films and the stretched films calculated as a film of 30 μm in thickness are shown in Table 6. The oxygen permeability of a stretched film was greatly reduced in comparison with an unstretched film.

The oxygen permeability of each film obtained in Examples 50 to 59 was measured in accordance with ASTM D3985-81 at 30° C. and 80% RH by using a MOCON® OXTRAN® Model 100 (produced by MODERN CONTROL Co.).

TABLE 6

Oxygen permeability of Stretched film of PVA containing metal compound

| | Metal compound | | Stretching temperature | Draw ratio | Oxygen permeability |
|---|---|---|---|---|---|
| | type | mmol/g | °C. | | cc/m$^2$ · day · atm |
| Example 50 | LiCl | 1.0 | — | 1 | 200 |
| Example 51 | MgCl$_2$ | 0.3 | — | 1 | 70 |
| Example 52 | MgCl$_2$ | 0.5 | — | 1 | 90 |
| Example 53 | CaCl$_2$ | 0.5 | — | 1 | 46 |
| Example 54 | LiCl | 1.0 | 110 | 4 | 25 |
| Example 55 | LiCl | 1.0 | 110 | 6 | 23 |
| Example 56 | LiCl | 1.0 | 110 | 9 | 21 |
| Example 57 | MgCl$_2$ | 0.3 | 115 | 9 | 8 |
| Example 58 | MgCl$_2$ | 0.5 | 115 | 9 | 15 |
| Example 59 | CaCl$_2$ | 0.5 | 120 | 9 | 13 |

EXAMPLE 60

A PVA composition containing 0.5 mmol of calcium chloride based on 1 g of PVA was obtained in the same way as in Example 43. An ethylene-vinyl acetate copolymer (NUC3190, produced by Nippon Unicar Co., Ltd.) for the first layer (inner layer), an ionomer resin (Himilan®, produced by Mitsui Dupon, Ltd.) for the fifth layer (outer layer), adhesive resins (Admer® SF 750, produced by Mitsui Petrochemical Industries, Ltd.) for the second and fourth layers, and the above-described PVA composition containing calcium chloride for the third layer (core layer) were co-extruded from a circular die through respective extruders at a die temperature of 225° C. so that the PVA-metal compound composition constituted the core layer. The extruded product was quenched, thereby obtaining a five-layer laminated film. The thickness of the first layer was 12 μm, each thickness of the second and fourth layers was 2 μm, the thickness of the third layer was 10 μm, and the thickness of the fifth layer was 28 μm. The total thickness of the laminated film was 54 μm.

EXAMPLE 61

A five-layer laminated film of the total thickness 500 μm obtained by the same method as Example 60 was stretched to 3 times in both machine and transverse directions by inflation at 95° C. The thickness of the first layer of the thus-obtained stretched film was 12 μm, each thickness of the second and fourth layer was 2 μm, the thickness of the third layer was 10 μm, and the thickness of the fifth layer was 28 μm. The total thickness of the laminated film was 54 μm.

The oxygen permeabilities of the unstretched film (Example 60) and the stretched film (Example 61) measured at 30° C. and 80% RH were 140 cc/m²·day·atm and 40 cc/m²·day·atm, respectively. It is obvious that the oxygen permeability of the stretched film was greatly improved in comparison with the unstretched film.

EXAMPLE 62

An aqueous $CaCl_2$ solution was mixed with PVA [Poval® PVA 105, produced by Kuraray Co., Ltd., polymerization degree: 500, saponification degree: 98.5%] so that the metal compound content came to 1 mmol based on 1 g of PVA. After the PVA was immersed in the aqueous solution at room temperature overnight, it was dried at 120° C. for 3 hours, thereby obtaining PVA containing $CaCl_2$.

The PVA containing $CaCl_2$ was melt-molded by a 30-Φ single screw extruder (L/D=22) with a T-die set thereon, thereby obtaining a film of 20 μm in thickness. The turpentine oil resistance of the thus-obtained film was measured in accordance with JIS S-1515. The turpentine oil resistance of a polyethylene film of 20 μm in thickness was also measured in the same way.

In the case of the polyethylene film, it was observed that the vegetable oil (turpentine oil) oozed out in 10 days, while in the case of the film composed of the PVA containing $CaCl_2$, no oil was observed to ooze out for not less than 60 days.

(Note) The turpentine oil resistance was measured in the following manner.

Apparatus (a) A cylindrical weight having a smooth bottom surface A (diameter: 100 mm, mass: 2.25 kg) and a weight B having a similar configuration (diameter: 25 mm, mass: 50 g).

(b) A metal ring having an inner diameter of 95 mm and a mass of about 200 g.

(c) A glass tube having an inner diameter of 25 mm and a height of 25 mm.

(d) Reagent: turpentine oil of JIS K5908

5 g of anhydrous calcium chloride (powder) and 1 g of oilsoluble red dye were added to 100 ml of the reagent. The container was stoppered and the mixture was thoroughly shaken. Thereafter, the mixture was allowed to stand for not less than 10 hours. The mixture was then filtered through dry filtering paper, and the filtrate was charged in a dry bottle. Grease (boiling point: 162.8° C., consistency 260 to 310) was added to the filtrate in the mixing ratio of 25 g based on 100 g of the filtrate, and the grease was completely dissolved in the filtrate by the use of a stirrer or the like. The solution was stored in the stoppered bottle.

(e) Sea sand which passed through a standard sieve of JIS Z 8801 having a standard mesh of 840 μm and which does not pass through a sieve having a mesh of 590 μm.

Test piece

Three test pieces of 100 mm × 100 mm were produced from a sample.

Operation

A test pieced place with the resin surface faced downward was folded inward along a diagonal line, and the folded test pieces was laid on a smooth glass surface. The weight A was gently placed on the fold with the center of the fold coincident with the center of the weight so as to apply the load to the test piece for 30 seconds.

Thereafter, the weight A was removed and the test piece was quickly unfolded. The test piece was placed with the resin surface faced upward, and then folded inward along the diagonal line orthogonal to the fold. The weight A was placed on the new fold in the same way.

The test piece having the two folds was unfolded and placed on white filtering paper a little larger than the test piece with the resin surface faces upward, and the metal ring was placed with the intersection of the two folds as the center. The glass tube was placed on the center of the metal ring and 5 kg of the sea sand was charged into the glass tube. After the glass tube was removed, 1.5 mml of the reagent was added dropwise to the sea sand. The weight B was placed with the intersection of the folds as the center so as to apply the load to the test piece for 2 hours. 0.5 ml of the reagent was added dropwise to the sea sand every hour 6 times while the weight B was placed on the test piece. When 20 hours elapsed after the glass tube was removed, the test piece was shifted to another position on the white filtering paper so as to examine the stain on the filtering paper. Thereafter, the same operation was repeated every hour. The three test pieces were tested and the period during which no stain was found on any of the three sheets of the filtering paper with the corresponding test pieces placed thereon was regarded as the oil resistance.

EXAMPLE 63

The above-described film composed of the PVA containing $CaCl_2$ in Example 62 was formed into a bag of 5 cm × 5 cm sealed on three sides. 5 g of a perfume was charged into the bag, and the bag was placed in 250-cc jar and allowed to stand at room temperature. The time required for the scent to be smelt in the jar was examined. The same test was made on a polyethylene bag (film thickness: 20 μm). In the case of the polyethylene bag, the scent was smelt in one day, but in the case of the bag composed of the PVA containing $CaCl_2$, the scent was not smelt for more than 60 days.

TABLE 7

|  | Thickness (μm) | Vanilla | Camphor |
| --- | --- | --- | --- |
| polyethylene bag | 20 | 1 day | 1 day |
| Bag composed of PVA containing $CaCl_2$ | 20 | 60 days or more | 60 days or more |

EXAMPLES 64 AND 65

A PVA composition was produced by adding to PVA 0.3 mmol of $MgCl_2$ based on 1 g of PVA. Films of 30 μm in thickness were produced from the thus-obtained PVA composition with 6-66 copolymer nylon [Toray Amilan® CM 6041] mixed therewith in a weight ratio of 50:50 (Example 64), and 80:20 (Example 65), respectively. As a result of measuring the oxygen permeability coefficients of the films at 30° C. and 0% RH, it was observed that the oxygen gas barrier properties of the films composed of the blend of the nylon and the PVA composition were more excellent than that of a nylon film, as shown in the Table 8. The gas barrier properties of the films composed of the blend of the nylon and the PVA composition were also more excellent than that of a nylon film at 80% RH.

TABLE 8

| | Oxygen Permeability Coefficient 0% RH | $cc \cdot cm \cdot cm^2 \cdot sec^{-1} \cdot cmHg^{-1}$ 80% RH |
|---|---|---|
| Nylon | $1.6 \times 10^{-12}$ | $4.6 \times 10^{-12}$ |
| Nylon/PVA (50:50 wt %) | $2.9 \times 10^{-13}$ | $8.0 \times 10^{-13}$ |
| Nylon/PVA (20:80 wt %) | $6.0 \times 10^{-14}$ | $4.8 \times 10^{-13}$ |

Measuring temperature: 30° C.

The impact strengths of the obtained films at a low temperature were measured by Rheometrics Dropweight Tester RDT-5000 (produced by Rheometrics, Inc.) under the conditions (velocity of impact: 25 cm/sec, weight: 1.89 kg, and measuring temperature: 5° C.). The results are shown in Table 9. It is obvious that the impact strength of the films composed of the blend of the nylon and the PVA composition of the present invention were more excellent than that of the film composed of the PVA composition.

TABLE 9

| | Energy (KJ) |
|---|---|
| PVA | $2.9 \times 10^{-2}$ |
| Nylon/PVA (50:50 wt %) | $3.9 \times 10^{-1}$ |
| Nylon/PVA (20:80 wt %) | $6.4 \times 10^{-2}$ |

EXAMPLES 66 AND 67

An aqueous lithium chloride solution was mixed with PVA [Poval® PVA 105, produced by Kuraray Co., Ltd., polymerization degree: 500, saponification degree: 98.5%] in the weight ratio of 1:1 so that lithium chloride was 1.0 mmol based on 1 g of PVA. After the PVA was immersed in the aqueous solution at room temperature overnight, it was dried at 120° C. for 3 hours, thereby obtaining PVA containing LiCl. An ethylene-vinyl acetate copolymer (NUC3190, produced by Nippon Unicar Co., Ltd.) for the first layer (inner layer), an ionomer resin (Himilan ®, produced by Mitsui Dupon, Ltd.) for the fifth layer (outer layer), adhesive resins (Admer ® SF 750, produced by Mitsui Petrochemical Industries, Ltd.) for the second and fourth layers, and the above-described PVA composition containing lithium chloride for the third layer (core layer) were extruded separately from each other by 4 extruders, and co-extruded from a circular die at a die temperature of 225° C. After the extruded product was quenched, it was heated at 95° C. for 5 seconds by inflation, and then stretched in both machine and transverse directions to 2 times (Example 66) or 3 times (Example 67), respectively.

COMPARATIVE EXAMPLE 8

A stretched film was obtained in the same way as in Examples 66 and 67 except that PVDC was used for the third layer (core layer) and the circular die temperature was 180° C.

The layer structure and the thickness of the respective layers of the films obtained in Examples 66 and 67, and Comparative Example 8 are shown in Table 10.

TABLE 10

| | Layer structure | Thicknesses of layers (μm) |
|---|---|---|
| Example 66 | EVA/Ad/Core 1/Ad/Ionomer | 12/2/15/2/30 |
| Example 67 | EVA/Ad/Core 1/Ad/Ionomer | 12/2/10/2/28 |
| Comparative Example 8 | EVA/Ad/Core 2/Ad/Ionomer | 20/2/7/2/40 |

Core 1: Core layer of PVA containing metal compound
Core 2: Core layer of PVDC

A sample of the thus-obtained films was inserted between polyethylene films of 40 μm in thickness each and the oxygen permeability and the carbon dioxide gas permeability thereof were measured at 30° C., 80% RH by a gas permeability tester (YANACO GTR-10A, produced by Yanagimoto Seisakusho Co.). The results are shown in Table 11.

TABLE 11

| | $CO_2$ gas permeability* | Oxygen permeability* | $CO_2$ gas permeability/ Oxygen permeability |
|---|---|---|---|
| Example 66 | 1150 | 50 | 23 |
| Example 67 | 1764 | 63 | 28 |
| Comparative Example 8 | 200 | 50 | 4 |

(Note)
*$cc/m^2 \cdot day \cdot atm$, at 30° C., 80% RH

What is claimed is:

1. A polyvinyl alcohol product obtained by heat-treating a melt-molded polyvinyl alcohol product composed of a polyvinyl alcohol composition containing 0.01 to 3.0 mmol of a metal compound based on 1 g of polyvinyl alcohol, said metal compound being selected from the group consisting of metal halides and metal nitrates where the metal element is selected from alkali metals, alkaline earth metals, and divalent to quadrivalent heavy metals.

2. The polyvinyl alcohol product according to claim 1, wherein the heat-treatment is conducted for 2 seconds to 90 minutes at a temperature which is higher than a glass transition temperature of the polyvinyl alcohol composition and lower than the temperature at which the polyvinyl alcohol composition begins to flow.

3. The polyvinyl alcohol product according to claim 1, wherein said alkali metal is selected from the group consisting of lithium, sodium and potassium.

4. The polyvinyl alcohol product according to claim 1, wherein said alkaline earth metal is selected from the group consisting of calcium, magnesium and strontium.

5. The polyvinyl alcohol product according to claim 1, wherein said divalent to quadrivalent heavy metal is selected from the group consisting of cobalt, tin, manganese, nickel, iron and titanium.

6. A polyvinyl alcohol product obtained by stretching a melt-molded polyvinyl alcohol product composed of a polyvinyl alcohol composition containing 0.01 to 3.0 mmol of a metal compound based on 1 g of polyvinyl alcohol, said metal compound being selected from the group consisting of metal halides and metal nitrates where the metal element is selected from alkali metals, alkaline earth metals, and divalent to quadrivalent heavy metals.

7. The polyvinyl alcohol product according to claim 6, wherein the area magnification in stretching is not less than 2.

8. The polyvinyl alcohol product according to claim 6, wherein the stretching temperature is 80° to 150° C.

9. The polyvinyl alcohol product according to claim 6, wherein said alkali metal is selected from the group consisting of lithium, sodium and potassium.

10. The polyvinyl alcohol product according to claim 6, wherein said alkaline earth metal is selected from the group consisting of calcium, magnesium and strontium.

11. The polyvinyl alcohol product according to claim 6, wherein said divalent to quadrivalent heavy metal is selected from the group consisting of cobalt, tin, manganese, nickel, iron and titanium.

12. A melt-molded polyvinyl alcohol product comprising a polyvinyl alcohol composition containing a metal compound which is selected from the group consisting of 0.4 to 0.8 mmol of a calcium halide or calcium nitrate based on 1 g of polyvinyl alcohol, 0.01 to 2.0 mmol of a lithium halide or lithium nitrate based on 1 g of polyvinyl alcohol, and a mixture thereof.

* * * * *